(12) United States Patent
Hwang

(10) Patent No.: US 10,619,810 B1
(45) Date of Patent: Apr. 14, 2020

(54) MULTI-PURPOSE SOLAR LAMP

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 16/540,097

(22) Filed: Aug. 14, 2019

(51) Int. Cl.
| | |
|---|---|
| *F21S 9/03* | (2006.01) |
| *F21V 21/02* | (2006.01) |
| *F21V 3/00* | (2015.01) |
| *F21V 21/08* | (2006.01) |
| *F21Y 115/10* | (2016.01) |
| *F21V 17/14* | (2006.01) |

(52) U.S. Cl.
CPC ............... *F21S 9/037* (2013.01); *F21V 3/00* (2013.01); *F21V 21/02* (2013.01); *F21V 21/0824* (2013.01); *F21V 17/14* (2013.01); *F21Y 2115/10* (2016.08)

(58) Field of Classification Search
CPC ...... F21V 21/02; F21V 21/0824; F21V 17/14; F21S 9/037
See application file for complete search history.

(56) References Cited

U.S. PATENT DOCUMENTS

| | | | | |
|---|---|---|---|---|
| 5,062,028 A | * | 10/1991 | Frost | F21S 8/081 136/291 |
| 5,367,442 A | * | 11/1994 | Frost | F21S 8/081 136/291 |
| D822,253 S | * | 7/2018 | Wu | D26/68 |
| D864,452 S | * | 10/2019 | Wei | D26/67 |
| D866,839 S | * | 11/2019 | Yan | D26/67 |
| 2014/0160772 A1 | * | 6/2014 | Wu | F21S 8/026 362/373 |
| 2018/0335185 A1 | * | 11/2018 | Boulanger | F21L 4/08 |
| 2019/0128486 A1 | * | 5/2019 | Hollinger | F21L 4/04 |

* cited by examiner

*Primary Examiner* — Alexander K Garlen
(74) *Attorney, Agent, or Firm* — Bacon & Thomas, PLLC

(57) ABSTRACT

A multi-purpose solar lamp includes an illumination lamp powered by solar power, a positioning board detachably fixed onto a wall or any plane, and a plug-in part pluggable into the ground. The positioning board and the plug-in part can be simultaneously or alternately combined to the back of the illumination lamp to allow users to conveniently fix the illumination lamp to the wall or a wooden or concrete ground or plug the plug-in part into the ground/soil as needed to achieve a multi-purpose effect.

8 Claims, 11 Drawing Sheets

MULTI-PURPOSE SOLAR LAMP

FIELD OF INVENTION

The present disclosure relates to a multi-purpose solar lamp, in particular to the solar lamp having a positioning board and a plug-in part simultaneously or alternately installed at the back of the solar lamp to allow users to conveniently fix the solar lamp to a wall or a wooden or concrete ground/soil as needed to achieve a multi-purpose effect.

BACKGROUND OF INVENTION

Description of the Related Art

Light emitting diode (LED) with a power saving feature and a light, thin, short and compact design is used extensively in various different lamps such as garden lights, and the garden lights are usually used in gardens, places around home, open-air restaurants, and outdoor recreational places, and some of the garden lights may be equipped with a solar panel, and the solar power of the solar panel is supplied as the power required for the operation of the garden lights and it has the eco-friendly and power-saving features.

The solar lamp of this sort comprises an LED light emitting module powered by the solar power and a positioning device fixed to the back of a light emitting module, and the positioning device in a pointed conical shape may be inserted into the ground/soil in order to plug the lamp into the ground/soil of a garden trail; or a positioning module comprising a plurality of screws or nails may be used to fix the lamp to a wall or a wooden or concrete plane of a column of a terrace or a pavilion.

However, after the lamp plugged into the ground/soil is removed, the lamp cannot be installed to the wall or any plane anymore. Similarly, the screws and nails cannot fix the lamp to the ground/soil securely anymore. Furthermore, the screws and nail may be rusted easily after a long time of use in an outdoor environment, so that the installed lamp cannot be removed easily from the wall or any plane in order to change the installation position. Obviously, the design of the conventional positioning device has limited the scope of use of the lamp.

Therefore, it is a subject of this disclosure to find a convenient way of fixing the solar lamp to a wall or any plane or plugging the solar lamp into a ground/soil as needed to overcome the drawbacks of the prior art.

SUMMARY OF THE INVENTION

Specifically, this disclosure relates to a multi-purpose solar lamp comprising: an illumination lamp powered by solar power, a positioning board detachably fixed onto any plane, and a plug-in part pluggable into the ground; the positioning board and the plug-in part being simultaneously or alternately combined with the back of the illumination lamp; the illumination lamp comprising a light emitting module, a solar panel, and a base capable of accommodating the light emitting module and the solar panel, and a light-transmitting lampshade being installed to the front of the base and provided for covering the light emitting module and the solar panel, and two hooks protruding from the bottom of the base for installing or removing the positioning board, and a plurality of plug holes concavely formed thereon for installing or removing the plug-in part; wherein the positioning board is in form of a sheet and has an area greater than the bottom of the base, and the positioning board has a top and a bottom, and when the top of the positioning board is stacked onto the bottom of the base, the positioning board has a plurality of positioning holes protruding from the periphery of the base for passing an external positioning part and fixing the positioning part to any plane, and the middle of the positioning board has two arc grooves for embedding the two hooks of the base and then deflecting and positioning the two hooks, and a plurality of through holes configured to be corresponsive to the plurality of plug holes of the base respectively, and the two hooks and the two arc grooves are provided for detachably combining the positioning board to the bottom of the base; and the plug-in part is in the shape of a tapered cross-shaped three-dimensional pointed cone formed by two triangular plates with the tips pointing downward and detachably and alternately assembled with each other, and each of the two triangular plates has a flat and straight top, and the top has a plurality of plug columns convexly formed thereon and configured to be corresponsive to the plurality of plug holes of the base respectively, and the plurality of plug columns can be plugged and positioned into the plug holes at the bottom of the base directly or passed through the plurality of through holes of the positioning board and then plugged and positioned into the plug holes at the bottom of the base, so that the positioning board and the plug-in part are simultaneously or alternately combined with the bottom of the base of the illumination lamp.

Compared with the prior art, the positioning board and the plug-in part of this disclosure are simultaneously or alternately combined with the back of the illumination lamp to allow users to conveniently fix the illumination lamp to a wall or a wooden or concrete ground or plug the plug-in part into the ground/soil as needed to achieve a multi-purpose effect. In addition, the plug-in part is formed by combining two triangular plates, so that the solar lamp can be detached to reduce the volume of the lamp to provide convenient storage and save storage and transportation costs.

In addition, when the positioning board and the plug-in part are combined to the back of the illumination lamp, and the plug-in part is plugged into ground/soil, the positioning board can separate the back of the illumination lamp from the ground/soil to prevent the moisture of the soil from affecting the service life of the illumination lamp.

DESCRIPTION OF THE PREFERRED EMBODIMENTS

Figure 1:
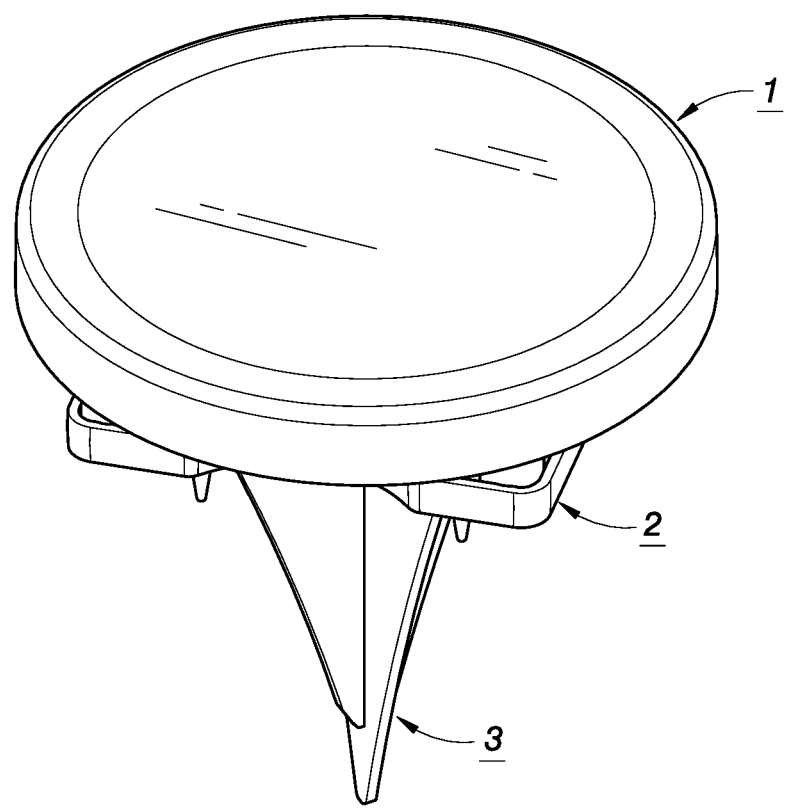
FIG. 1 is a perspective view of the present disclosure.

The present disclosure will become clearer in light of the following detailed description of an illustrative embodiment of this disclosure described in connection with the drawings, so that people having ordinary skill in the art can implement the present disclosure according to the description of this specification.

With reference to FIGS. 1 to 4 for a multi-purpose solar lamp in accordance with the present disclosure, the multi-purpose solar lamp comprises an illumination lamp 1, a positioning board 2, and a plug-in part 3, characterized in that the positioning board 2 and the plug-in part 3 are detachably combined to the back of the illumination lamp 1, or simultaneously installed to the back of the illumination lamp 1.

The illumination lamp 1 comprises a light emitting module 10, a solar panel 11, and a base 20 capable of accommodating the light emitting module 10 and the solar panel 11, and the base 20 has a front 201 and a bottom 202, and a light-transmitting lampshade 30 is installed to the front 201 of the base 20 and provided for covering the light emitting module 10 and the solar panel 11.

The light emitting module 10 comprises a circuit board 13 having a plurality of LED lamps 12, an LED driver 14 electrically coupled to the circuit board 13, and an electric energy storage member 15 electrically coupled to the solar panel 11, and the electric energy storage member 15 is provided for supplying the power required for the operation of the circuit board 13 and the LED driver 14.

The light-transmitting lampshade 30 has a frame 31 surrounding the outer periphery of the front 201 of the base 20, and a transparent cover 32 mounted onto the inner periphery of the frame 31, and the plurality of LED lamps 12, the circuit board 13, the LED driver 14, the electric energy storage member 15 and the solar panel 11 are installed into the base 20, and a waterproof gasket 21 is installed between the light-transmitting lampshade 30 and the base 20, so that the light-transmitting lampshade 30 and the base 20 can be combined closely with each other after the assembling to prevent the interior of the light emitting module 10 from being damaged by moisture, and the transparent cover 32 is configured to be corresponsive to the plurality of LED lamps 12 and the front of the solar panel 11, and embossed lines 321 are formed on the inner side of the transparent cover 32 and provided for uniformly scattering the light emitted from the LED lamp 12.

The positioning board 2 is substantially in the form of a sheet and has an area greater than the bottom 202 of the base 20, and the positioning board 2 has a top and a bottom. When the top of the positioning board 2 is stacked onto the bottom 202 of the base 20, the positioning board 2 will protrude from the periphery of the base 20, and the protruded periphery of the positioning board 2 has a plurality of positioning holes 40 formed thereon, and provided for passing a positioning part such as a screw or a nail in order to fix the positioning board 2 to any plane such as a wall or a wooden or concrete ground.

The base 20 comprises two hooks 50 protruding from the bottom 202 separately, a plurality of plug holes 60 concavely formed on the base 20, two arc grooves 51 formed at the middle of the positioning board 2 and provided for embedding the two hooks 50 and then deflecting and positioning the two hooks, and a plurality of through holes 61 configured to be corresponsive to the plurality of plug holes 60 respectively.

The two hooks 50 are provided for installing and uninstalling the positioning board 2, and the plug holes 60 are provided for installing and uninstalling the plug-in part 3, so that the positioning board 2 and the plug-in part 3 can be combined to the back of the illumination lamp 1 simultaneously or alternately.

Each of the two hooks 50 has an extension board 501 protruding from the bottom of the positioning board 2, and a stop plate 502 installed at one of the ends of the extension board 501 and engaged with a side edge of the corresponding arc groove 51 of the positioning board 2 to prevent the two hooks 50 and the positioning board 2 from being loosened or separated after they are combined with each other.

Figure 5:
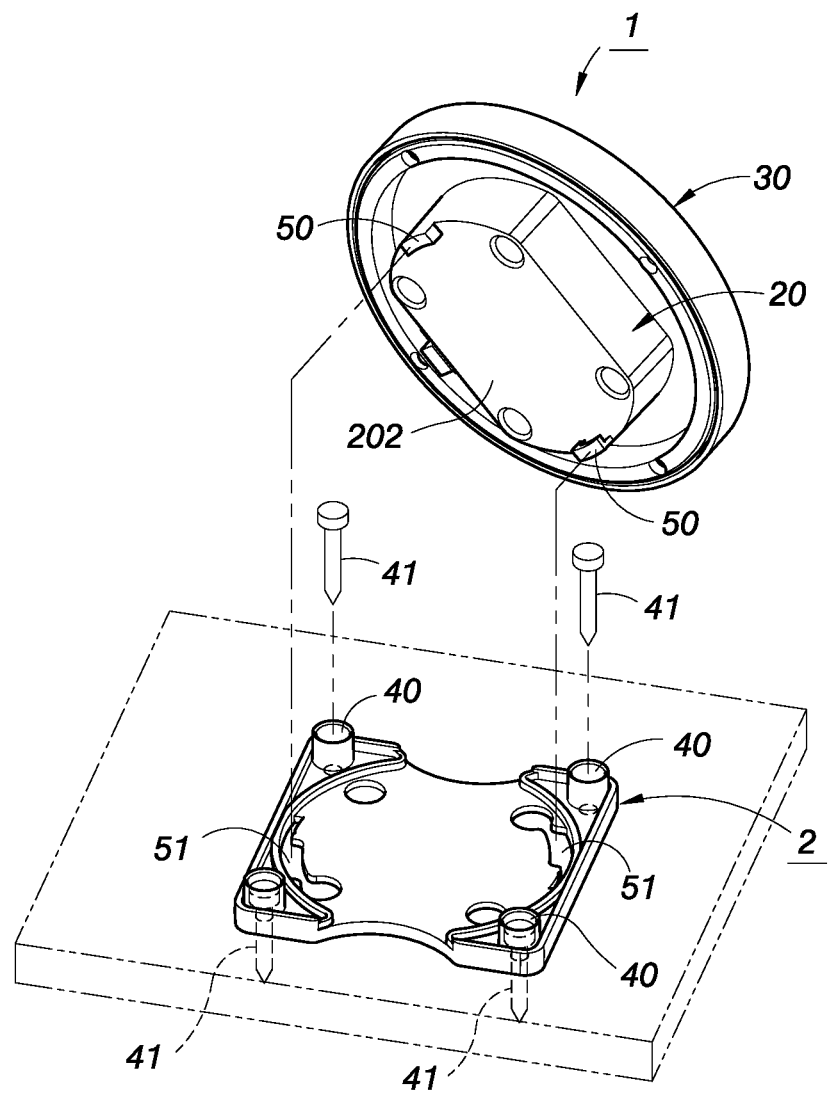
FIG. 5 is a schematic view of a positioning board fixed to any plane in accordance with the present disclosure.
Figure 6:
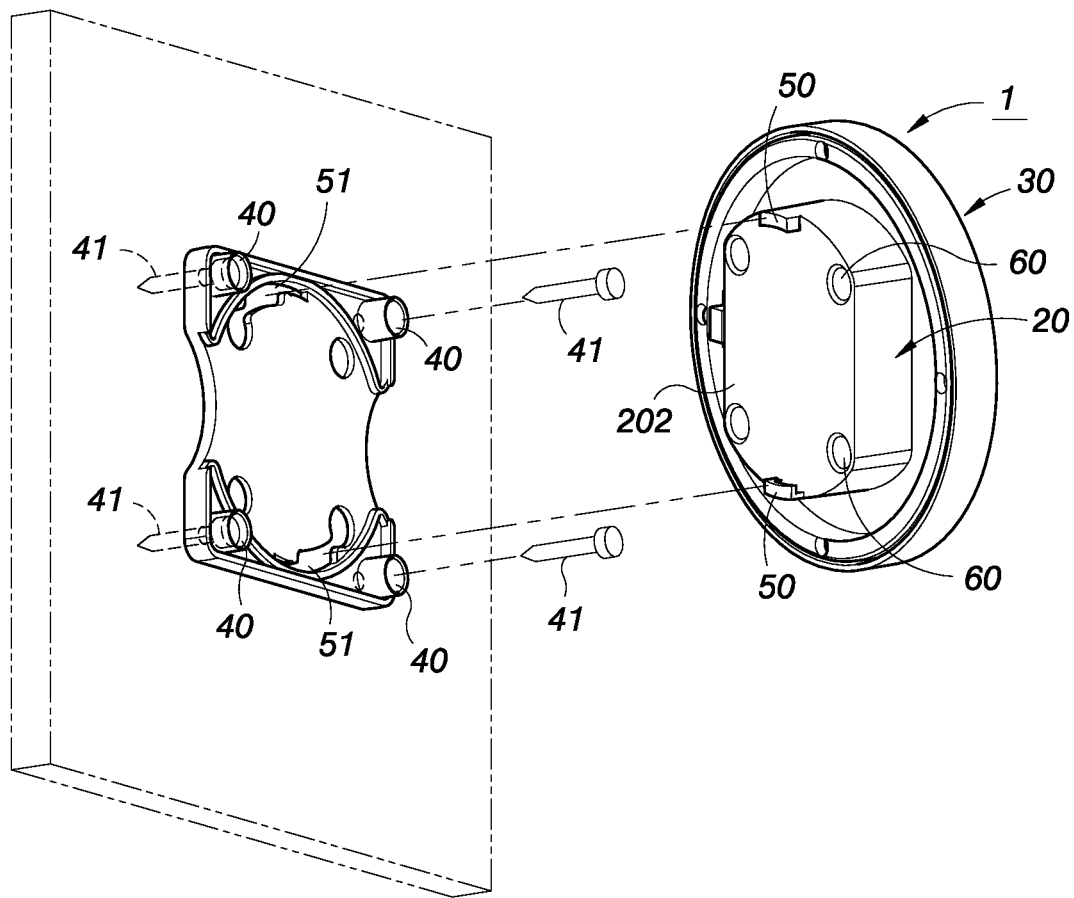
FIG. 6 is a schematic view of a positioning board fixed to a wall in accordance with the present disclosure.

In FIGS. 5 and 6, when the illumination lamp 1 is ready to be installed onto any plane such as a wall or a wooden or concrete ground, a plurality of external positioning part 41 passes through the plurality of positioning holes 40 of the positioning board 2 respectively to fix the positioning board 2, and then abuts the back of the illumination lamp 1 against the top of the positioning board 2 to make room for the two hooks 50 at the bottom 202 of the base 20 to align with the two arc grooves 51 respectively.

Figure 7:
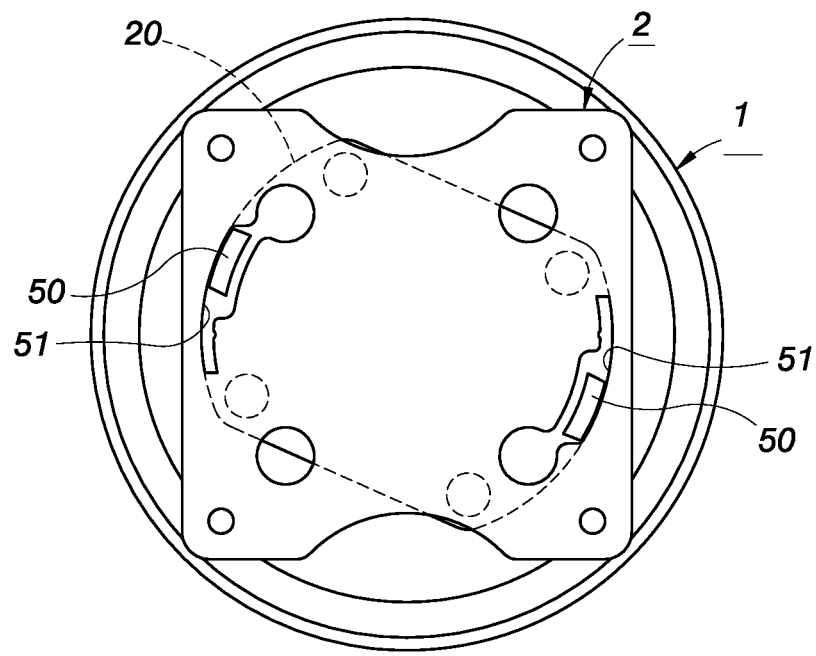
FIG. 7 is a first schematic view of two hooks of an illumination lamp combined with two arc grooves of a positioning board in accordance with the present disclosure.
Figure 8:
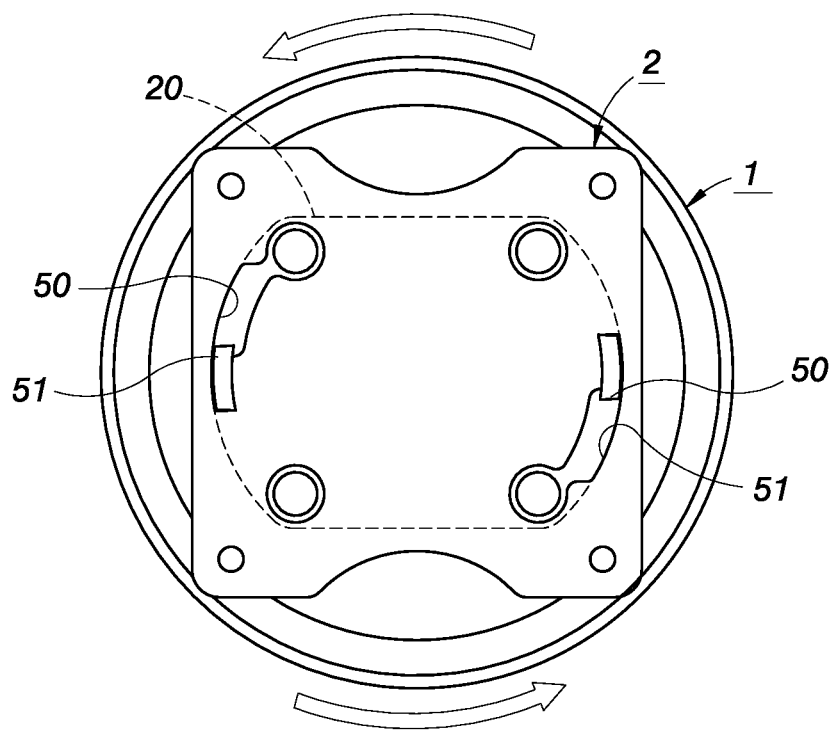
FIG. 8 is a second schematic view of two hooks of an illumination lamp combined with two arc grooves of a positioning board in accordance with the present disclosure.

In FIGS. 7 and 8, the extension boards 501 of the two hooks 50 (see FIG. 3) are passed into the two arc grooves 51 of the positioning board 2 respectively, and then the illumination lamp 1 is rotated to engage the stop plates 502 of the two hooks 50 to a side edge of the arc grooves 51 in order to combine the illumination lamp 1 with the positioning board 2 to provide the illumination function.

When a user wants to remove the illumination lamp 1, the user simply needs to rotate the illumination lamp 1 in the opposite direction to separate the stop plates 502 of the two hooks 50 from the side edges of the arc grooves 51 of the positioning board 2 and then remove the illumination lamp 1 from the positioning board 2.

Figure 2:
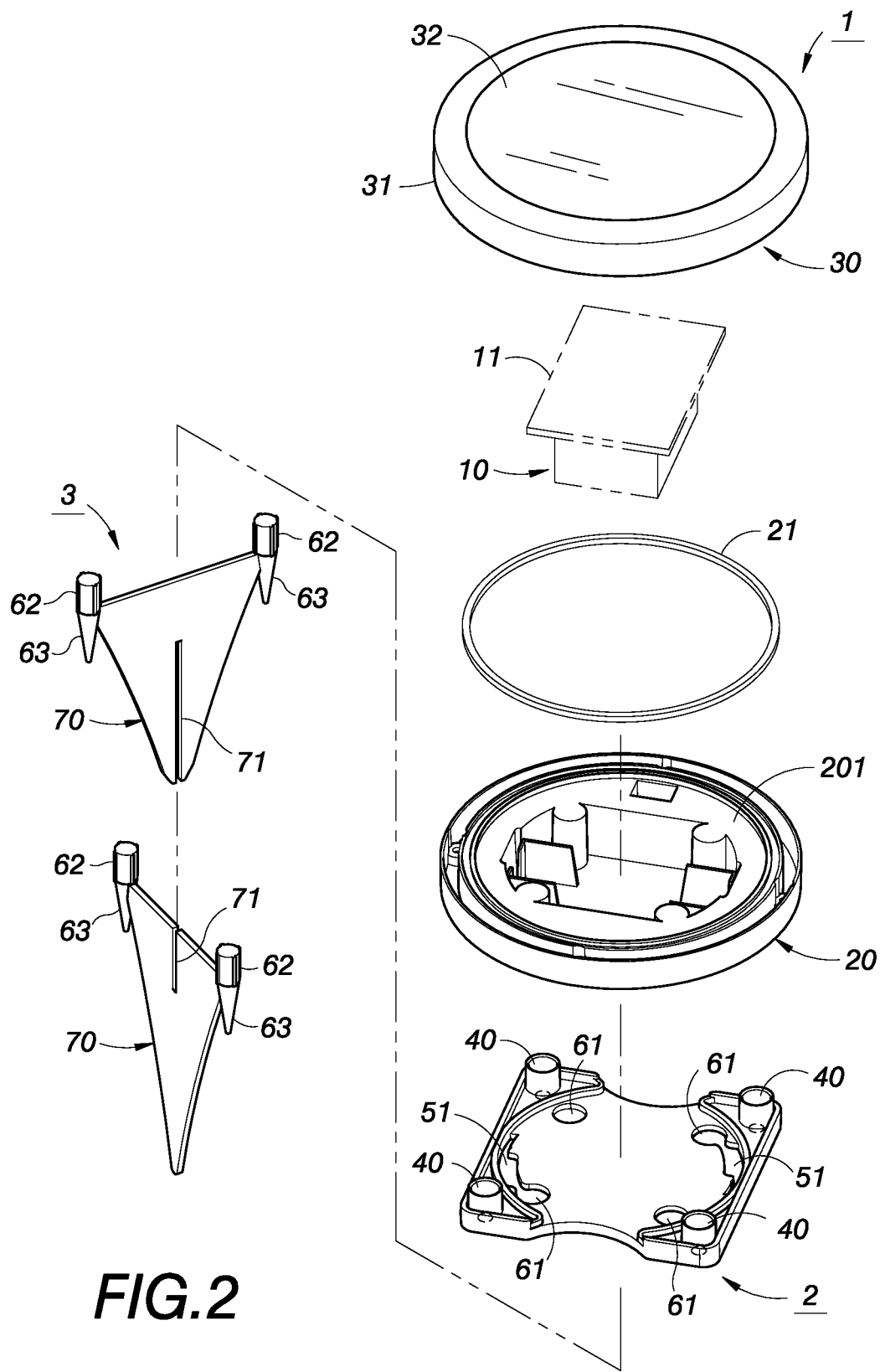
FIG. 2 is an exploded view of the present disclosure.
Figure 3:
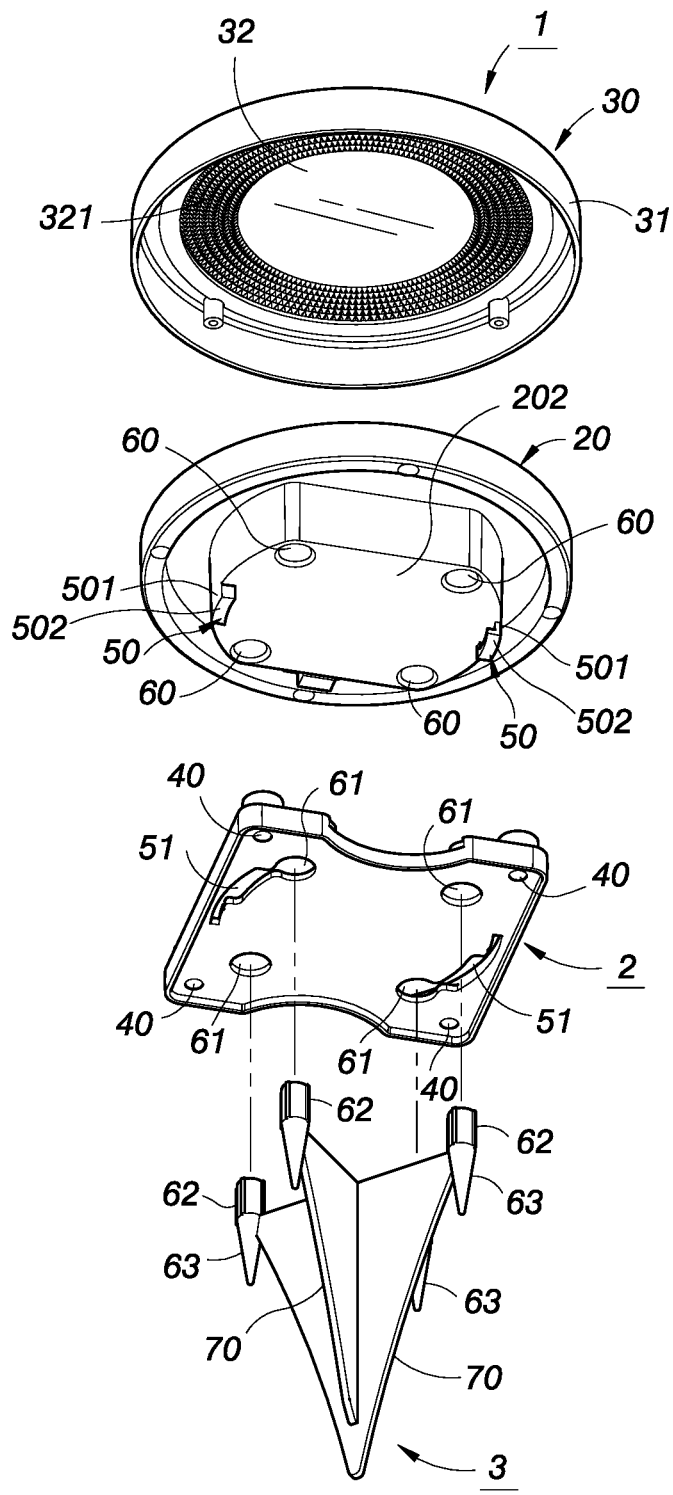
FIG. 3 is another exploded view of the present disclosure.
Figure 4:
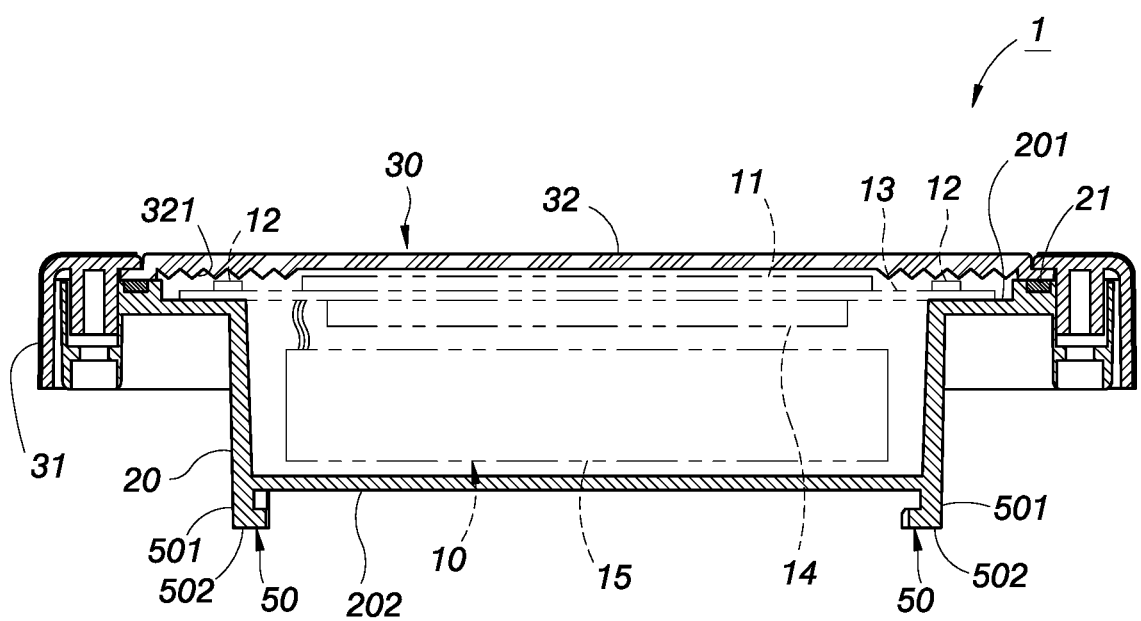
FIG. 4 is a side view of an illumination lamp of the present disclosure.

With reference to FIGS. 2 and 3 for the description of the plug-in part 3, the plug-in part 3 is in a shape of a tapered cross-shaped three-dimensional pointed cone formed by combining two upwardly pointed triangular plates 70, and each of the two triangular plates 70 has a flat and straight top, and the middle of the top of one of the triangular plates 70 as well as the middle of the tip of the other triangular plate 70 have a plug slot 71, and the two plug slots 71 can be embedded with each other, so that the two triangular plates 70 can be embedded and plugged alternately with each other and assembled through the two plug slots 71 to form the cross-shaped three-dimensional pointed cone. In addition, the two triangular plates 70 can be disassembled and stacked on each other to reduce volume.

Further, the top of the two triangular plates 70 has a plurality of plug columns 62 convexly formed thereon and configured to be corresponsive to the plurality of plug holes 60 of the base 20 respectively, and the plug columns 62 are disposed on both sides of the top of the two triangular plates 70, and the top of each plug column 62 is protruded out from the top of the triangular plate 70. In an embodiment, the surface of the plurality of plug columns 62 has a plurality of ribs, and thus the external diameter of the plug column 62 is slightly greater than the internal diameter of the plug hole 60 of the base 20, and when the plug columns 62 are plugged into the plug holes 60 directly, a tight fit assembly can be achieved to prevent the illumination lamp 1 from falling off from the plug-in part 3.

Figure 9:
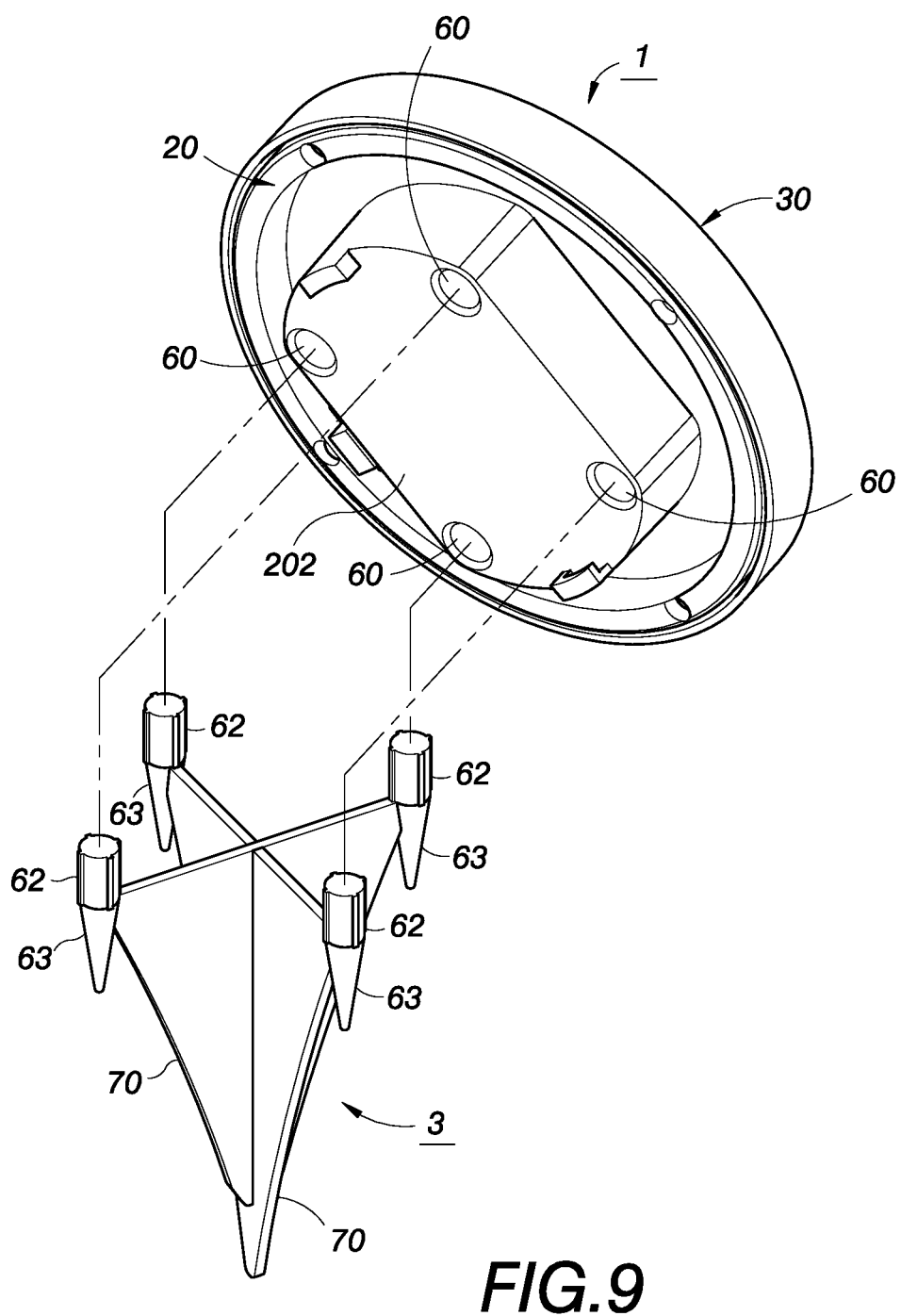
FIG. 9 is a schematic view showing a combination of an illumination lamp and a plug-in part in accordance with the present disclosure.
Figure 10:
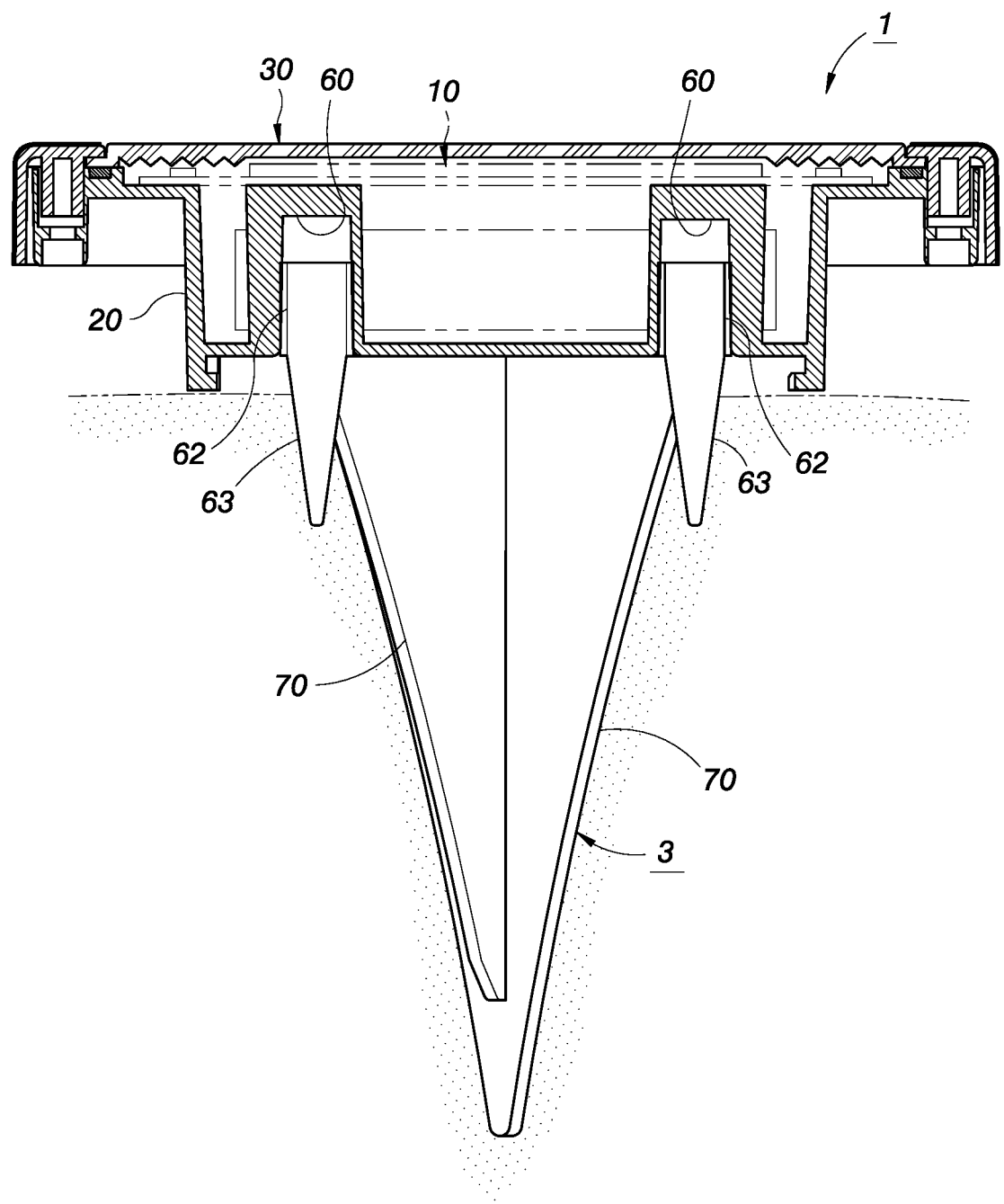
FIG. 10 is a side view showing a combination of an illumination lamp and a plug-in part in accordance with the present disclosure.

In FIGS. 9 and 10, when the illumination lamp 1 is ready to be inserted into the ground/soil, the two triangular plates 70 are embedded and plugged with each other to form the cross-shaped three-dimensional pointed cone first, and the plug-in part 3 is formed, and then the plug columns 62 are plugged into the plug holes 60 of the base 20 of the illumination lamp 1 directly to complete a tight-fit assembly, and finally the illumination lamp 1 is plugged into the ground/soil through the plug-in part 3 to provide the illumination function. In an embodiment, the bottom of each plug column 62 extends downwardly to form a pointed conical auxiliary positioning cone 63, so that when the plug-in part 3 is plugged into the ground/soil, the auxiliary positioning cone 63 is also plugged into the ground/soil to enhance the positioning function.

When the user wants to remove the illumination lamp 1, the user simply needs to unplug the plurality of plug columns 62 of the plug-in part 3 from the plug holes 60 of the illumination lamp 1 and remove the illumination lamp 1 from the plug-in part 3.

Figure 11:
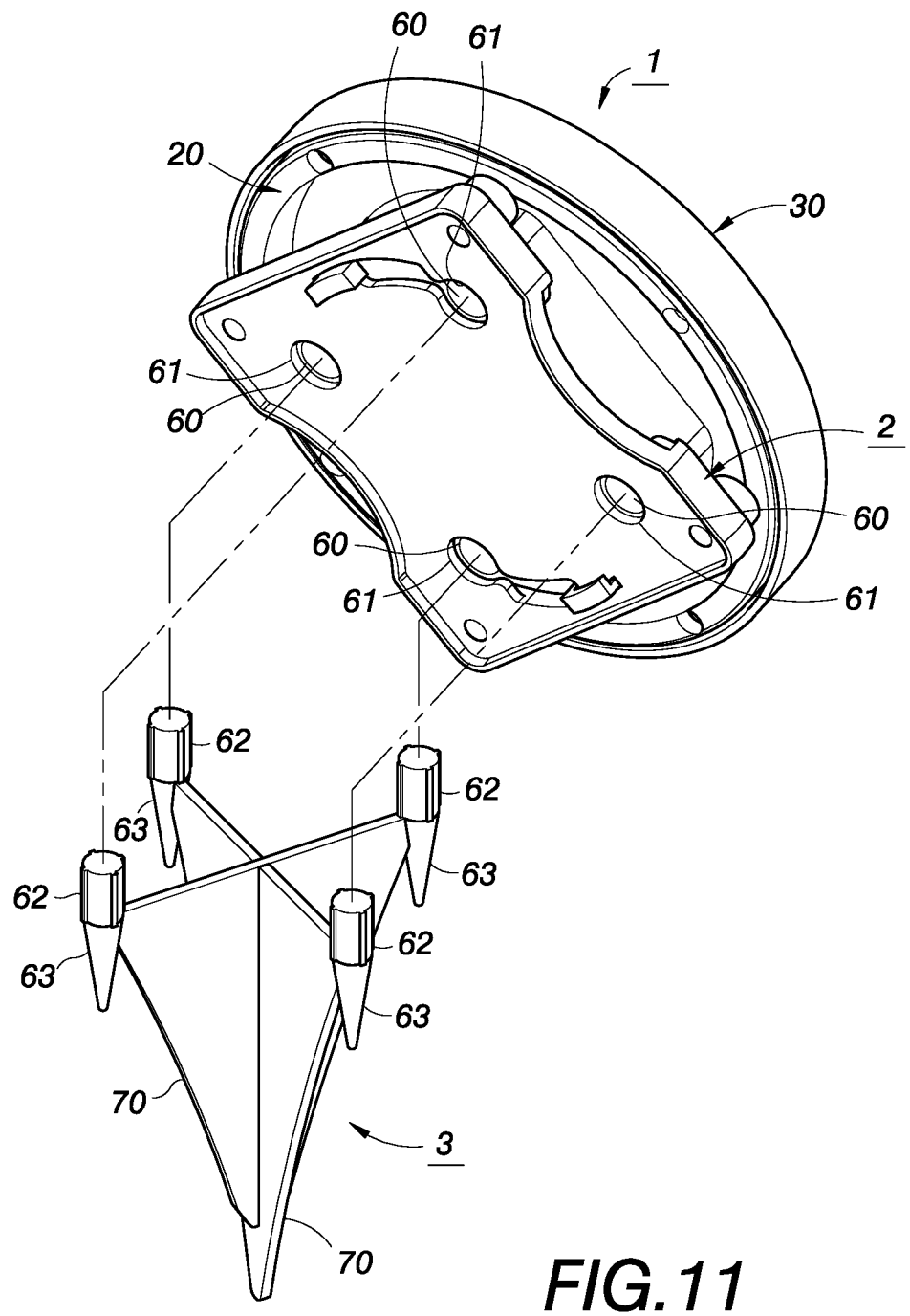
FIG. 11 is a schematic view showing a combination of an illumination lamp, a positioning board and a plug-in part in accordance with the present disclosure.
Figure 12:
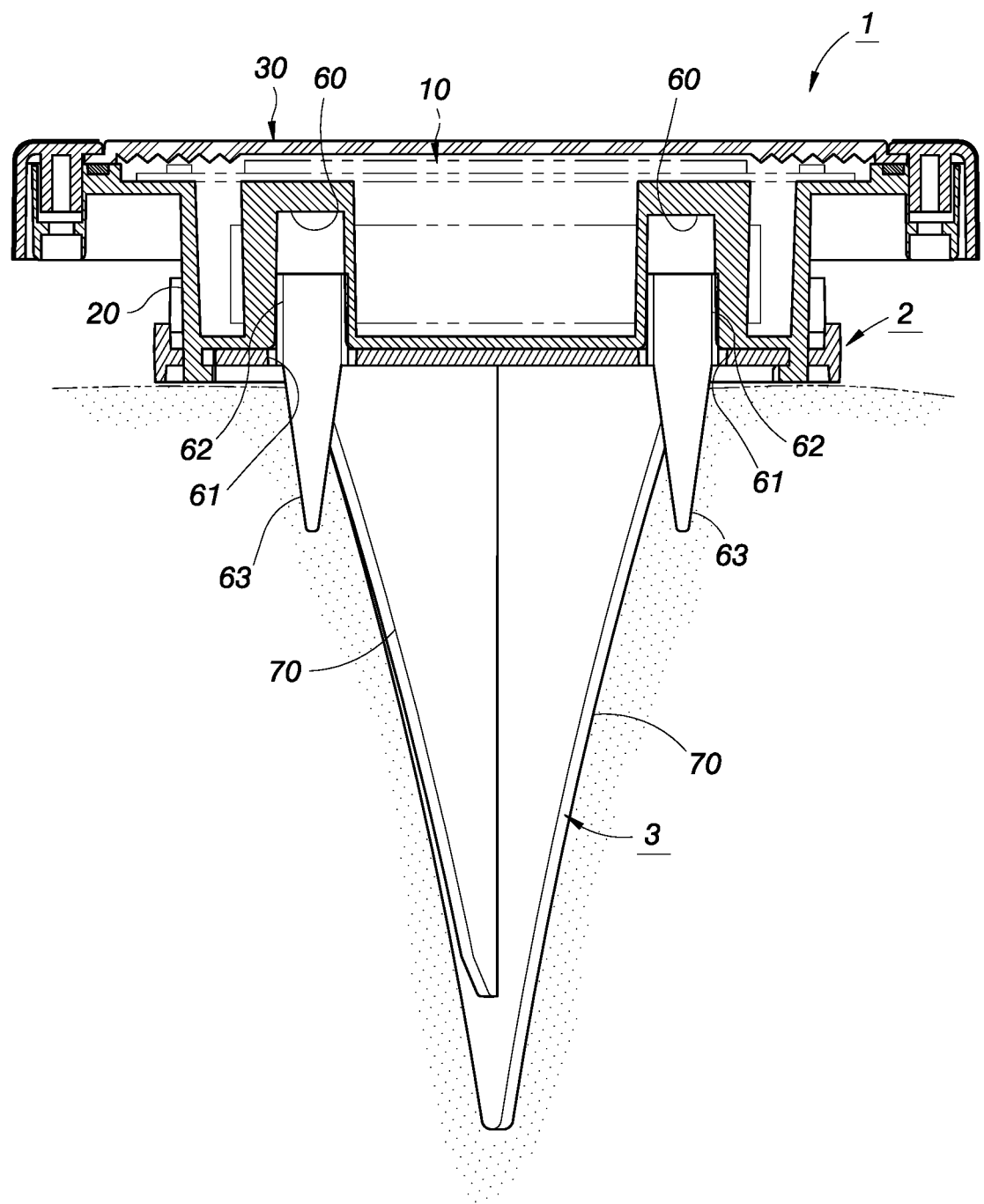
FIG. 12 is a side view showing a combination of an illumination lamp, a positioning board and a plug-in part in accordance with the present disclosure.

With reference too FIGS. 11 and 12 for another assembling method, the illumination lamp 1 is combined with the positioning board 2 first, and then the plug columns 62 of the plug-in part 3 are passed through the through holes 61 of the positioning board 2 and plugged into the plug holes 60 of the illumination lamp 1, and finally the illumination lamp 1 and the positioning board 2 are plugged into the ground/soil through the plug-in part 3 to provide the illumination function.

This assembling method has the following advantages: 1. The positioning board 2 can isolate the back of the illumination lamp 1 from the ground/soil to prevent the moisture in the soil from affecting the service life of the illumination lamp 1. 2. This method can prevent the positioning board 2 from missing. When it is necessary to move the illumination lamp 1 to a wall or any plane, the positioning board 2 can be accessed immediately.

By the aforementioned structure, the positioning board 2 and the plug-in part 3 are simultaneously or alternately combined with the back of the illumination lamp 1 to allow the users to conveniently fix the illumination lamp 1 to a wall or a wooden or concrete ground or plug the illumination lamp 1 into the ground/soil through the plug-in part 3 as needed to achieve a multi-purpose effect. In addition, the plug-in part 3 is formed by combining two triangular plates 70, so that the plug-in part 3 can be disassembled to achieve the effects of reducing volume, facilitating storage, and lowering the transportation cost.

While the present disclosure has been described by means of specific embodiments, numerous modifications and variations could be made thereto by those skilled in the art without departing from the scope and spirit of this disclosure set forth in the claims.

What is claimed is:

1. A multi-purpose solar lamp, comprising an illumination lamp powered by solar power, a positioning board detachably fixed onto any plane, and a plug-in part pluggable into the ground, and the illumination lamp comprising a light emitting module, a solar panel, and a base capable of accommodating the light emitting module and the solar panel, and the base having a front and a bottom, and a light-transmitting lampshade being installed to the front of the base and provided for covering the light emitting module and the solar panel, and two hooks protruding from the bottom of the base for installing or removing the positioning board, and a plurality of plug holes concavely formed thereon for installing or removing the plug-in part; wherein the positioning board is in form of a sheet and has an area greater than the bottom of the base, and the positioning board has a top and a bottom, and when the top of the positioning board is stacked onto the bottom of the base, the positioning board has a plurality of positioning holes protruding from the periphery of the base for passing an external positioning part and fixing the positioning part to any plane, and the middle of the positioning board has two arc grooves for embedding the two hooks of the base and then deflecting and positioning the two hooks, and a plurality of through holes configured to be corresponsive to the plurality of plug holes of the base respectively, and the two hooks and the two arc grooves are provided for detachably combining the positioning board to the bottom of the base; and the plug-in part is in shape of a tapered cross-shaped three-dimensional pointed cone formed by two triangular plates with the tips pointing downward and detachably and alternately assembled with each other, and each of the two triangular plates has a flat and straight top, and the top has a plurality of plug columns convexly formed thereon and configured to be corresponsive to the plurality of plug holes of the base respectively, and the plurality of plug columns can be plugged and positioned into the plug holes at the bottom of the base directly or passed through the plurality of through holes of the positioning board and then plugged and positioned into the plug holes at the bottom of the base, so that the positioning board and the plug-in part are simultaneously or alternately combined with the bottom of the base of the illumination lamp.

2. The multi-purpose solar lamp of claim 1, further comprising a plug slot formed at the middle of the top of one of the triangular plates of the plug-in and the middle of the tip of the other triangular plate separately, so that the two triangular plates can be embedded and plugged through the two plug slots and assembled with each other to form the cross-shaped three-dimensional pointed cone.

3. The multi-purpose solar lamp of claim 1, wherein the plurality of plug columns are disposed on both sides of the top of the two triangular plates respectively, and the top of each plug column protrudes from the top of the triangular plate, and the bottom of each plug column extends downwardly to form a pointed conical auxiliary positioning cone.

4. The multi-purpose solar lamp of claim 1, wherein each of the two hooks has an extension board protruding from the bottom of the positioning board, and a stop plate installed at one of the ends of the extension board and engaged with a side edge of the corresponding arc groove of the positioning board, so as to prevent the two hooks and the positioning board from being loosened or separated after being combined with each other.

5. The multi-purpose solar lamp of claim 1, wherein the light emitting module comprises a circuit board having a plurality of LED lamps, an LED driver electrically coupled to the circuit board, and an electric energy storage member electrically coupled to the solar panel and provided for supplying the electric power required for the operation of the circuit board and the LED driver.

6. The multi-purpose solar lamp of claim 5, wherein the light-transmitting lampshade has a frame wrapping around the periphery of the front of the base front, and a transparent cover mounted onto the inner periphery of the frame, and configured to be corresponsive to the plurality of LED lamps and the front of the solar panel.

7. The multi-purpose solar lamp of claim 6, wherein the transparent cover has a plurality of embossed lines densely distributed on the inner side of the transparent cover for scattering the light emitted from the LED lamp.

8. The multi-purpose solar lamp of claim 1, further comprising a waterproof gasket installed between the light-transmitting lampshade and the base to combine the light-transmitting lampshade and the base with each other closely.

* * * * *